March 7, 1961    J. B. POPPER    2,973,660
COOPERATING WEDGES INCLUDING MATING WORMS
Filed Sept. 3, 1958    2 Sheets-Sheet 1
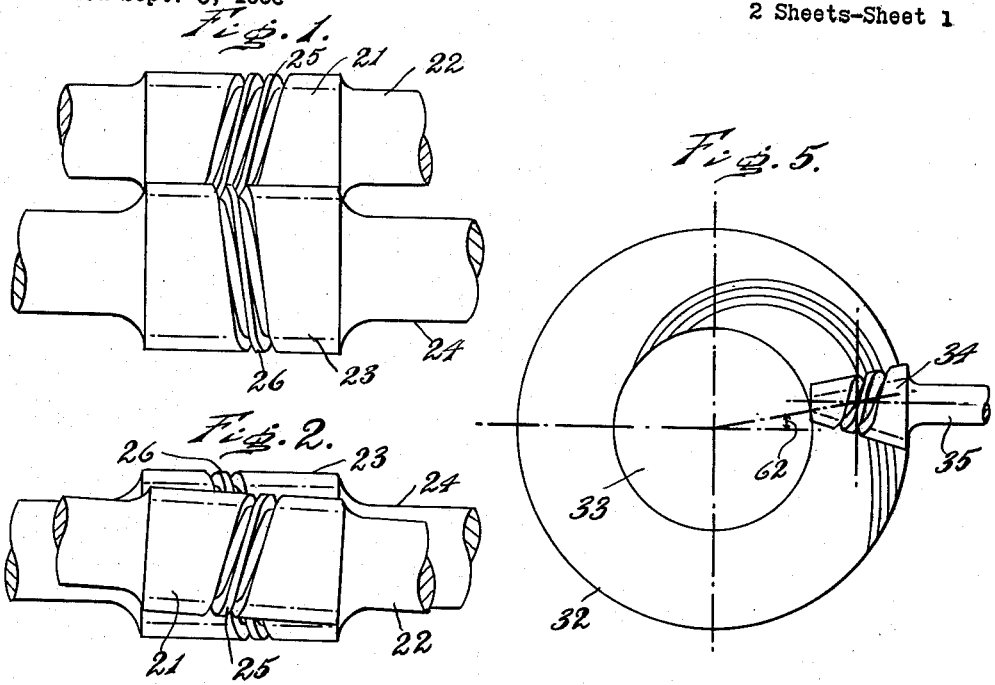
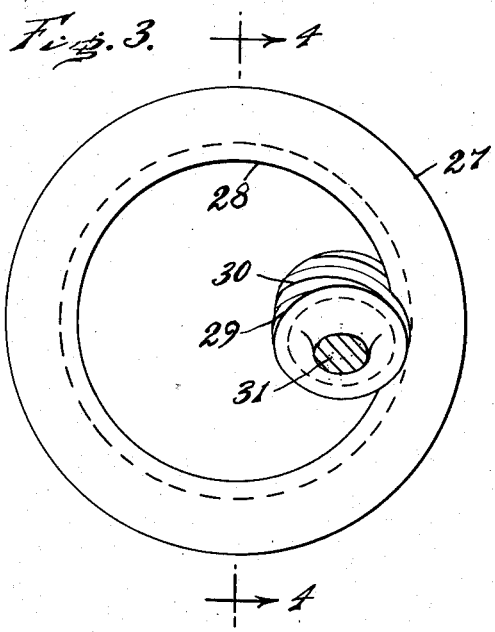
INVENTOR
Jakhin Boaz Popper
BY
ATTORNEYS

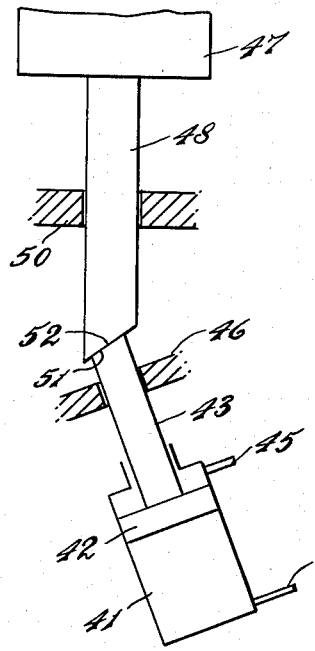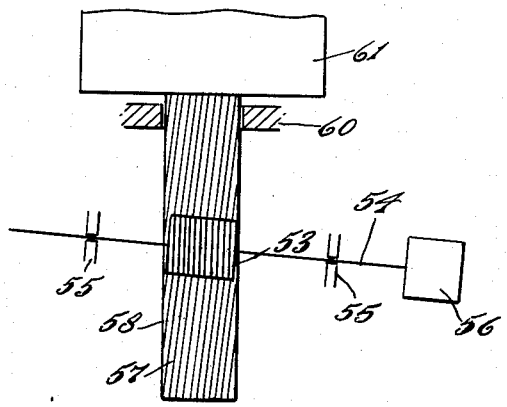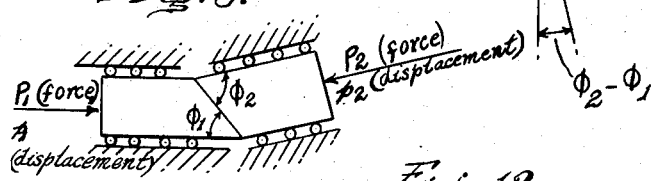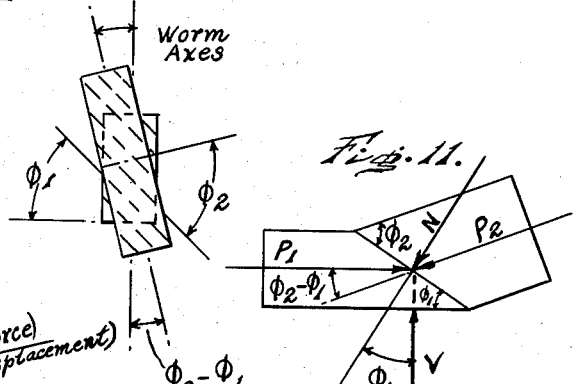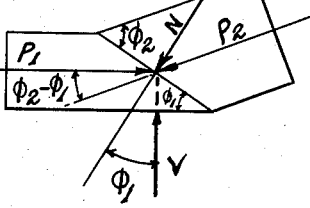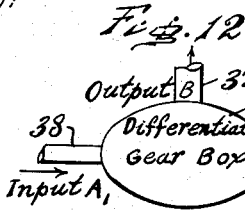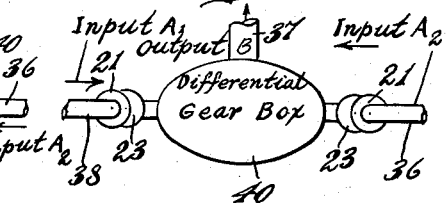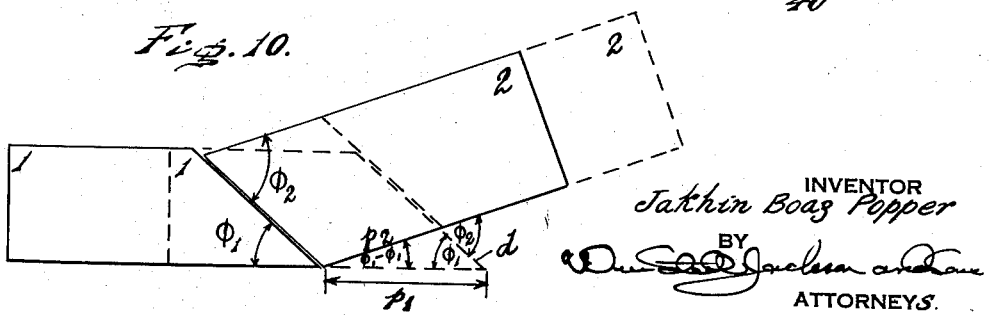

United States Patent Office 2,973,660
Patented Mar. 7, 1961

2,973,660

COOPERATING WEDGES INCLUDING MATING WORMS

Jakhin Boaz Popper, Spilberg House, Kfar Ata, near Haifa, Israel

Filed Sept. 3, 1958, Ser. No. 758,813

34 Claims. (Cl. 74—424.5)

The present invention relates in its broader aspects to cooperating wedges, and includes mating worms. The invention in one aspect includes self-locking or one-way motion gears, in which the function of the driving and driven gears is not interchangeable.

A purpose of the present invention is to provide self-locking gears which have a higher efficiency.

A further purpose is to obtain self-locking gears in which a wide variety of selected transmission ratios are possible, even 1:1.

A further purpose is to produce a self-locking gear combination in which equal power is required to raise and to lower the load.

A further purpose is to provide self-locking gears in which the axes are disposed at a smaller angle than 90° to one another and almost parallel.

A further purpose is to provide a worm combination which is almost self-locking, with a view to minimize the transmission of vibration and shock back through the gear train.

A further purpose is to provide self-locking gears such that the driving gear can drive the driven gear in either direction, but as soon as the driven gear exhibits a tendency to overtravel it will bind the combination and prevent all motion.

A further purpose is to impart partial or complete braking action by means of the response of a driven gear to the driving action.

A further purpose is to produce a combination of self-locking gears, both of which are worms, which can be cut on a standard thread cutting lathe or automatic screw machine.

A further purpose is to obtain the characteristics already discussed in respect to gears in the form of cooperating wedges or cooperating wedge surfaces, which can be utilized to provide self-locking interaction between reciprocating members or between a rotary member and a reciprocating member, while at the same time securing very high efficiency.

A further purpose is to utilize a mechanism of the invention in connection with any rotating device, such as servo mechanism or a follow-up mechanism, so as to avoid overshooting of the output.

Further purposes appear in the specification and in the claims.

In the drawings I have chosen to illustrate a few embodiments of the invention, choosing the form shown from the standpoints of convenience in illustration, satisfactory operation, and clear demonstration of the principles involved.

Figure 1 is a self-locking worm combination according to the invention. This combination is analogous in position to a spur-gear combination.

Figure 2 is a plan view of the structure of Figure 1.

Figure 3 is an elevation partly broken away showing a self-locking internal gear combination according to the invention.

Figure 4 is a section on the line 4—4 of Figure 3.

Figure 5 is an elevation of a gear combination according to the invention which in position is similar to a bevel-gear combination.

Figure 6 is a diagrammatic side elevation partly in axial section showing the wedge action in accordance with the invention applied to reciprocating motion, the device being self-locking.

Figure 7 is a diagrammatic side elevation showing the principles of the invention applied to convert self-locking rotary motion to linear motion.

Figure 8 is a diagram of two inclined planes useful in explaining the principles of the invention.

Figure 9 is a diagram of two worms, to assist in the explanation.

Figure 10 is a diagram showing the relation between displacements and angles in the case of sliding planes.

Figure 11 is a view showing the force applicable to the problem of the sliding planes.

Figure 12 is a block diagram showing the relationship of input to output in a conventional differential.

Figure 12a is a view similar to Figure 12 showing the relationship of input to output in a differential having self-locking inputs according to the invention.

In the drawings in the various cases, only a few of many turns have been shown on each worm, adopting the well recognized convention.

As well known in the art, self-locking gears usually comprise a worm in mesh with a worm wheel, with their axes at right angles to one another. This common form has a number of drawbacks. The efficiency is very low, even with the best worm-worm wheel combination, the efficiency hardly reaching 50% and rarely exceeding 45%. Furthermore, in order to obtain adequate self-locking in said prior art combinations, it is often necessary to use gears which are of relatively very low efficiency. It is furthermore frequently found that the wear on such gears is considerable.

In the prior art an effort has been made to provide self-locking helical gears as in Roano U.S. Patents Nos. 1,772,688; 2,553,383; and 2,553,384, which are primarily intended to operate on parallel axes, and which in the earliest development contemplate bringing the corners of the threads of one helical gear into engagement with the threads of the other helical gear with corresponding serious difficulty through wear (U.S. Patent 2,553,383, column 1, line 41 and column 24, line 66) and which in all developments employ relative pitch angles which give primarily sliding rather than rolling contact between the threads of the respective gears. These designs are primarily concerned with reducing the sizes of the gears for a particular gear ratio.

One of the advantages of the present invention is that the difficulty through wear previously encountered is avoided, the axes of the worms being disposed to one another at an angle which equals the difference between the pitch angles, so that worm thread forms of any standard or desired shape will engage at the sides rather than at the corners, with the sliding velocity being much less than the peripheral velocity of either of the worms.

In accordance with the present invention, when self-locking of gears is desired, two worms are associated so that the pitch angle of the thread of the driving gear is equal to or smaller than the angle of friction, and the pitch angle of the thread of the driven gear is larger than the pitch angle of the thread of the driving gear but the amount by which it is larger does not exceed 15°, and for high efficiency preferably should not exceed 5°. In order that ordinary self-locking action be obtained it is sufficient that the pitch angle of the driven gear be greater than the angle of friction, as long as it bears the 15° relation to the pitch angle of the driving gear. However, in the case of so-called second-order self-locking, when overtravel of the output will cause the drive to lock, it is necessary that the pitch angles of both the driving and driven gears be less than the angle of friction, but again the 15° relation must be obtained.

It has been found, as later explained, that efficiency increases with increasing coefficient of friction and decreasing difference between the angles of pitch.

The difference between the angles of pitch can be reduced to a very small value, but cannot be made zero as then no self-locking would be obtained.

In case the 15° limitation referred to above is exceeded, difficulty is encountered because the efficiency drops off very quickly.

The principles of the invention can also be applied in constructions in which the effect is "almost" self-locking, in the sense that the efficiency is extremely low in case the output gear tends to drive the input. In a case of this sort, the pitch angle of the thread of the driving gear must be greater than the angle of friction, but very close to it, and the pitch angle of the thread of the driven gear must be higher than the pitch angle of the thread of the driving gear, by an amount up to 15°, preferably not exceeding 5°.

The principles of the invention when embodied in gearing may produce constructions which are analogous to conventional spur-gears, internal gears and bevel gears, although in fact worms are used.

In the case of a device which takes the form of a spur-gear, the axes of the two worms should cross each other at an angle equal to the difference between the angles of pitch of the threads of the two gears, in order that proper meshing can be achieved. The threads of the two worms are disposed in opposite directions.

In the case of the construction which is similar to an internal gear, the worm axes should cross in the same way as in the construction similar to a spur-gear. In this case the helix directions of the threads are the same on both worms.

In the construction which is of the type of a bevel gear, the two bevel worms should be positioned off center relative to one another by an angle 62 measured to the center of one of the worms which is substantially equal to the difference between the two angles of pitch of the worms.

In a particular example, using the spur-gear type arrangement according to the invention, the crossing angle was 0.8°, the angle of friction was 8°, corresponding to a coefficient of friction of 0.14, and the gears had an efficiency respectively of 88, 90, 92 and 95.5%, according to whether the design had a safety factor of 2.0, 1.75, 1.5 or 1.0. The safety factor to obtain self-locking is defined in the discussion below.

This contrasts with the efficiency figures for well known self-locking gears which commonly are of the order of 33, 36.5, 40 and 50%, respectively.

*Description of embodiments of the invention*

The worms illustrated in Figures 1 and 2 comprise a cylindrical driving worm 21 on a shaft 22 and a similar cooperating driven worm 23 on a shaft 24. The axes of the worms and shafts cross on an angle which is in the plan view shown at about 3°. The driving worm 21 has a helical thread 25 and the driven worm 23 has a helical thread 26 which is on an opposite helix angle from the thread 25. For the sake of simplicity only a few turns have been shown.

On the assumption that the worms are both made of steel, the coefficient of friction may, for example, be 0.15, which corresponds to an angle of friction of 8.5°. If the safety factor to obtain self-locking is to be 1.5, the angle of pitch of the driving gear is 5.7°, and the efficiency of the gear combination is 80%. If the safety factor to obtain self-locking is 1.75, then the angle of pitch of the driving gear is 4.9°, and the efficiency is 76%. If the safety factor to obtain self-locking is 2, the angle of pitch of the driving gear is 4.25°, and the efficiency is 72.5%.

Once the safety factor for self-locking has been chosen, the angle of pitch $\phi$ is calculated in accordance with the formula $$\phi = \frac{f}{s}$$

where $\phi$ is measured in radians, $f$ is the coefficient of friction, and $s$ is the safety factor for self-locking.

An angle of pitch of the axes of 3° has been chosen for illustrative purposes because otherwise the drawings would not make the crossing angle clearly apparent. In actual fact a smaller angle might even be preferable, since a higher efficiency can be obtained. An angle less than 0.5° will generally not be indicated because of problems of precision in manufacture.

The function of the worms 21 and 23 cannot be interchanged, since once worm 21 has been designed as the driving worm and worm 23 has been designed as the driven worm, they must always function in that manner. For the purpose of making the gears self-locking, the transmission ratio does not matter, and it can be 1:1 or any other ratio, either stepping up or stepping down. However, the gear remains self-locking independently of the direction of rotation of the driving worm.

The gear combination illustrated in Figures 3 and 4 comprises an internal worm 27 with internal worm thread 28, and a bulbous or barrel shaped worm 29 with a helical thread 30. Only a few turns of each of the threads is shown. One of the worms is designed from the outset as the driving worm, and either one can be the driving worm, but once it is designed as the driving worm it must retain that function. The choice as to which is to be the driving worm will ordinarily be dictated by the question as to whether a step-up or step-down transmission is desired. In plan as viewed in Figure 4, the direction of the thread 28 is opposite to that of the thread 29. However, as the thread 28 is provided on the concave face of the worm, both threads actually have the same helix direction, as they are either both left-hand or both right-hand.

The axis of shaft 31 of worm 29 is inclined toward the ideal axis of internal worm 27. When viewed in section in Figure 4 the two axes include an angle between 0 and 15°, which is the same as the difference between the pitch angles of the two threads.

Instead of making the inner face of internal worm 27 cylindrical and worm 29 convex or barrel shaped, the worm 29 may be cylindrical and the internal face of the internal worm 27 may be convex, that is, hyperboloid.

In the embodiment of the invention shown in Figure 5, a conical or bevel worm 32 on shaft 33 meshes with a conical worm 34 on shaft 35. The difference between the angle of pitch of the threads of both worms is between 0 and 15°. By the same angle 62 the axes of the two shafts are off center with relation to one another, measuring the angle from the axis of gear 33 to the center of gear 34.

A small model of the device of Figures 1 and 2 on actual test gave an efficiency of 87%, including the losses in the shaft bearing. This model was designed according to the principles of second-order self-locking as later described.

It is believed that efficiencies of the order of 95% are readily obtainable.

Since the device of the invention uses shafts of the two gears which are almost but not quite parallel, the requirement that the shafts of conventional worm drives be at right angles is avoided. The transmission ratio can vary over a wide range and can be of the order of 1:1, and such transmission ratios have been very difficult to obtain in conventional worm drives. It will also be appreciated that where the device raises and lowers a load at different times, the power required to raise and to lower can be made identical.

An important aspect of the invention is that the pitch angles of the two worms are different from one another, and the angle between the shafts equals the difference in the pitch angles. This assures that the engaging side surfaces of the threads will have sliding velocities which are less and ordinarily very much less than the peripheral velocity of either one of the worms. It will be evident that in accordance with the invention there is side thread engagement at a position intermediate between the top and bottom on the threads, and this is true whether the thread form is square, V, trapezoidal or of other suitable shape.

*Force equations for inclined plane transmission*

The problem of analyzing the forces transmitted by meshing gears or screw threads can be simplified by considering only small contacting elements of surface of the meshing gears. The problem then reduces itself to the analysis of two inclined planes sliding one on the other. The generalized problem is represented in Figure 8. The two planes are sliding freely, with the only friction being at the contact face between the two planes. This friction is denoted by $f$, the coulomb (dry) friction coefficient. The contact faces make angles of $\phi_1$ and $\phi_2$ respectively with the direction of motion of the planes. The driving and opposing forces are denoted by $P_1$ and $P_2$, and the respective displacements by $p_1$ and $p_2$. I arbitrarily define the forces and displacements as positive if they act in the directions of the respective arrows.

In order to help visualize the connection between the sliding planes and the complete gears, Figure 9 shows two worm gears in mesh with each other. The angles $\phi_1$ and $\phi_2$ here represent the respective pitch angles of the two worms, and $\phi_2 - \phi_1$ is the angle between the two worm shafts. It is evident that the sliding planes of Figure 8 are a schematic and analogous representation of the system of Figure 9. The immediate aim is to find the relations between the forces $P_1$ and $P_2$, as a function of the angles $\phi_1$ and $\phi_2$ and of $f$.

Consider two sliding planes, whose initial positions are shown by the solid lines of Figure 10. If plane 1 is displaced by $p_1$ in the positive direction, then the resulting displacement of plane 2 will be $p_2$ in the negative direction, as shown by the dotted lines. Applying the law of sines to the small triangle, I obtain $$-\frac{p_1}{p_2} = \frac{\sin(180° - \phi_2)}{\sin \phi_1}$$

$$-\frac{p_1}{p_2} = \frac{\sin \phi_2}{\sin \phi_1} \quad (1)$$

where the minus takes care of the fact that $p_1$ and $p_2$ are always of opposite sign. Similarly, I obtain $$d = p_1 \frac{\sin(\phi_2 - \phi_1)}{\sin \phi_2} \text{ if } p_1 > 0 \quad (2a)$$

and $$d = -p_1 \frac{\sin(\phi_2 - \phi_1)}{\sin \phi_2} \text{ if } p_1 < 0 \quad (2b)$$

where $d$ is the sliding distance and where $\sin \phi_2$ has been substituted for $\sin(180° - \phi_2)$.

In the following discussion, it will be assumed that $$\phi_2 > \phi_1 \quad (3)$$

This is certainly no restriction of the theory, since, if $\phi_2 < \phi_1$, I need only interchange the indices in the various equations.

The various forces acting on the planes are shown in Figure 11. V is the vertical reaction on plane 1. (In case of a gear drive, this represents the axial thrust.) N is the normal force between the two planes. The friction force $fN$ (not shown) is perpendicular to N. Since the forces on either one or on both planes are in equilibrium, I can write, for the components in the $P_2$ direction of all forces acting on both planes from the outside $$P_2 = P_1 \cos(\phi_2 - \phi_1) + V \sin(\phi_2 - \phi_1) \quad (4)$$

Similarly, for the components in the N direction of all forces acting on plane 1 alone, I can write $$N = P_1 \sin \phi_1 + V \cos \phi_1 \quad (5)$$

Before proceeding with the analysis, I must now distinguish between three different possible cases:

*Case I.*—$P_1$ tends to drive the mechanism against $P_2$, which is denoted mathematically as $$P_1 > 0 \quad p_1 > 0$$
$$P_2 > 0 \quad p_2 < 0$$

This is a symbolical representation only, since possibly $p_1 = 0$, but the tendency is to make $p_1 > 0$. It will later on be seen that case I represents ordinary driving without any self-locking.

*Case II.*—$P_2$ tends to drive the mechanism against $P_1$. ($P_2$ wants to become the driver.) This is denoted by $$P_1 > 0 \quad p_1 < 0$$
$$P_2 > 0 \quad p_2 > 0$$

It will later be seen that this case, under certain conditions, represents ordinary self-locking.

*Case III.*—$P_1$ and $P_2$ together tend to drive the mechanism in the direction of $-p_1$, against the friction force between the planes. (As applied to two worms in mesh, this case means that wheel 2 tends to go faster than it is driven by wheel 1, i.e., wheel 2 tries to "help" wheel 1 instead of opposing it.) This is denoted by $$P_1 < 0 \quad p_1 < 0$$
$$P_2 > 0 \quad p_2 > 0$$

It will later be seen that this case, under certain conditions, represents second-order self-locking.

Ordinary self-locking means that if wheel 1 is designed to drive wheel 2 in either direction, wheel 2 cannot drive wheel 1 in either direction. The new property which is referred to as "second-order self-locking" means that, as before, wheel 1 can drive wheel 2 in either direction, and wheel 2 cannot drive wheel 1 at all, and in addition as soon as wheel 2 tries to go faster than it is driven by wheel 1 (that is, if a force applied to wheel 2 tends to "help" wheel 1) the whole transmission is immediately stopped.

I now apply the method of virtual work, which states that, for a small displacement, the algebraic sum of the work done at the input and at the output must equal the energy dissipated by friction. In other words, $$P_1 p_1 + P_2 p_2 = fNd \quad (6)$$

Considering case I, for example, the input work is $P_1 p_1$ while the output work is $P_2 p_2$. Taking into account the signs of these four quantities, as specified above for case I, I find that the output work $P_2 p_2$ is negative. (This means that, whereas the input force $P_1$ does work, the output force $P_2$ has work done on it.) The physical meaning of Equation 6 thus is that the input work minus the output work equals the friction loss. Similar explanations hold for the other two cases. For case II, $P_2 p_2$ becomes the input work, and $P_1 p_1$ the output work. For case III, both $P_1 p_1$ and $P_2 p_2$ are positive, which means that both forces perform work together against the friction force.

Combining Equation 6 with those previously found, I obtain the following three relations:

For case I:

$$P_1 = P_2 \frac{\sin \phi_1 + f \cos \phi_1}{\sin \phi_2 + f \cos \phi_2} \begin{cases} P_1 > 0 \\ P_2 > 0 \\ p_1 > 0 \\ p_2 < 0 \end{cases} \quad (7I)$$

For case II:

$$P_2 = P_1 \frac{\sin \phi_2 - f \cos \phi_2}{\sin \phi_1 - f \cos \phi_1} \quad \begin{cases} P_1 > 0 \\ P_2 > 0 \\ p_1 < 0 \\ p_2 > 0 \end{cases} \quad (7\text{II})$$

For case III:

$$P_1 = P_2 \frac{\sin \phi_1 - f \cos \phi_1}{\sin \phi_2 - f \cos \phi_2} \quad \begin{cases} P_1 < 0 \\ P_2 > 0 \\ p_1 < 0 \\ p_2 > 0 \end{cases} \quad (7\text{III})$$

Conditions for self-locking

The above three equations can now be examined to see under what conditions self-locking can occur. The mathematical condition for self-locking is that the driving force needed to overcome the driven force becomes infinitely large. This means that the denominator in Equation 7 must become zero.

It is evident that, for case I, self-locking cannot take place. For case II, self-locking will occur as soon as $\tan \phi_1 \leqslant f$, or when $$S_1 = \frac{f}{\tan \phi_1} \geq 1 \quad (8)$$

Here, $S_1$ represents the "safety-factor," which, if self-locking is desired, should always be kept somewhat greater than one, to make sure that self-locking is maintained even if $f$ should fall below the assumed value.

It is evident that Equation 7II becomes invalid as soon as $S_1 > 1$, since the drive is then locked, so that no motion at all takes place.

For case III, self-locking will occur as soon as $$S_2 = \frac{f}{\tan \phi_2} \geq 1 \quad (9)$$

This kind of self-locking is called "second-order self-locking." It occurs not because the driven wheel wants to become the driver (which is the cause of ordinary self-locking, case II), but because the driven wheel wants to help the driver. As before, $S_2$ represents the safety-factor for maintaining second-order self-locking. Also as before, Equation 7III becomes invalid as soon as $S_2 > 1$.

Because of the assumption expressed by Equation 3, $S_1$ will always be larger than $S_2$. Thus, as $f$ is increased, I will first reach a condition of ordinary self-locking, and then of second-order self-locking. It is thus impossible to have second-order self-locking without having at the same time also ordinary self-locking. (This also provides the explanation as to why I have written both Equations 7II and 7III, which seem to be actually identical. The appearance of second-order self-locking cannot be predicted from Equation 7II, since that equation becomes invalid as soon as $S_1 > 1$. As I have seen, second-order self-locking does not occur until $S_2 = 1$, at which time I already have $S_1 > 1$, so that Equation 7II would already be invalid.)

It should be noted here that the $f$ referred to up to now and in the discussion to follow is the "active" or "virtual" coefficient of friction. In the case where the threads of the worm gear have parallel sides (as in a square thread), this virtual coefficient of friction is identical with the actual or "true" coefficient of friction. However, where the threads are inclined (as with Acme threads or V-threads), the virtual coefficient is given by $$f_{\text{virtual}} = \frac{f_{\text{true}}}{\cos \theta_n} \quad (10)$$

where $\theta_n$ is the pressure angle, or the semi-angle of the thread profile measured on a normal section perpendicular to the helix. (For a standard V-thread, for example, $\theta_n$ is approximately 30°, while, for an Acme thread, it is about 14½°.)

Efficiencies

Having found the conditions for which self-locking takes place, the next step is to find the efficiencies for the various cases.

As long as $P_1$ is the driving force, and $P_2$ opposes $P_1$, I have case I, and the efficiency $e$ can be expressed as $$e = \left| \frac{P_2 p_2}{P_1 p_1} \right| \quad (11)$$

where the absolute value is used, since $p_1$ and $p_2$ are of opposite sign. Substituting Equations 7I and 1 into the above, I obtain $$e = \frac{1 + f/\tan \phi_2}{1 + f/\tan \phi_1} = \frac{1 + S_2}{1 + S_1} \quad \begin{cases} P_1 > 0 \\ P_2 > 0 \\ p_1 > 0 \\ p_2 < 0 \end{cases} \quad (12)$$

This shows that, to increase the efficiency, $S_2$ should be increased, and $S_1$ should be decreased. To maintain self-locking, $S_1$ must of course be kept greater than one.

Assuming $\phi_2$ and $\phi_1$ to be fairly small (smaller than about 20°), I can write $\tan \phi$ is approximately equal to $\phi$, in radians, so that the efficiency can be expressed as $$e = 1 - \frac{S_1/(1+S_1)}{1 + \frac{1}{S_1} \cdot \frac{f}{(\phi_2 - \phi_1)}} \quad \begin{cases} P_1 > 0 \\ P_2 > 0 \\ p_1 > 0 \\ p_2 < 0 \end{cases} \quad (12a)$$

where $\phi_1$ and $\phi_2$ are the respective pitch angles in radians.

This formula shows that, once the safety-factor $S_1$ for self-locking has been decided upon, the efficiency can be increased by increasing the factor $f/(\phi_2 - \phi_1)$. This is done either by decreasing the difference between the pitch angles, or by increasing the friction coefficient $f$. It may seem strange at first that an increase in friction will increase the efficiency. The explanation, however, may be visualized by means of the following vague analogy: If a locomotive is travelling up an inclined track, then an increase in the friction between the wheels and the rails will cause less slipping, and therefore an increase in the driving efficiency.

The above does not mean that I can increase the efficiency by throwing sand into the worm transmission. On the contrary, once the drive has been designed and built, an increase in friction will decrease the efficiency, as can be seen if I substitute $\phi_1/(\phi_2 - \phi_1)$ for the factor $f/S_1(\phi_2 - \phi_1)$ in Equation 12a. In other words, an increase in $f$ will only produce an increase in efficiency if $f$ is increased before the other quantities are decided upon, and if the whole design is then carried out accordingly, so as to utilize this higher value of $f$. Once the design is fixed and the drive is built, the efficiency can only be increased by decreasing $f$. Of course, if $f$ is decreased too much, then $S_1$ will fall below one, and the drive will no longer be self-locking.

It must again be stressed that $f$ represents the active or virtual coefficient of friction, as defined by Equation 10. This fact provides me with the possibility of increasing $f$ artificially. Thus, to get a high $f$ for the sake of higher efficiency, I need only increase the pressure angle of the thread.

For the case where a transmission is to be designed for second-order self-locking, the efficiency, Equation 12, is better expressed in terms of $S_2$ instead of $S_1$, resulting in the relation $$e = 1 - \frac{S_2}{\left(\frac{f}{\phi_2 - \phi_1}\right)\left(1 + \frac{1}{S_2}\right) - 1} \quad \begin{cases} P_1 > 0 \\ P_2 > 0 \\ p_1 > 0 \\ p_2 < 0 \end{cases} \quad (12b)$$

where $\phi_1$ and $\phi_2$ are the pitch angles expressed in radians.

I now consider the case where $P_2$ is the driving force, and $P_1$ opposes $P_2$ (case II). If $S_1 \geq 1$, I have self-locking, so that the efficiency has no meaning. If $S_1<1$, the drive will turn, and the efficiency is now $$e=\left|\frac{P_1 p_1}{P_2 p_2}\right| \quad (13)$$

which, after substituting Equations 7II and 1, becomes $$e=\frac{1-f/\tan\phi_1}{1-f/\tan\phi_2}=\frac{1-S_1}{1-S_2} \begin{vmatrix} P_1 > 0 \\ P_2 > 0 \\ p_1 < 0 \\ p_2 > 0 \end{vmatrix} \quad (14)$$

Finally, I consider case III, where both $P_1$ and $P_2$ drive in the same direction against the friction between the sliding surfaces. Again, if $S_2 \geq 1$, I have self-locking, so that the efficiency has no meaning. On the other hand, if $S_2 < 1$, the transmission will turn, but again the efficiency has no physical meaning here, since there is no output work. (Both forces do input work, against the friction.) I can, however, calculate the relation between the forces $P_1$ and $P_2$. I thus define the force ratio $e^*$ as $$e^* = \frac{P_2}{P_1} \cdot \left|\frac{p_2}{p_1}\right| \quad (15)$$

which, after substituting Equations 7III and 1, becomes $$e^* = \frac{1-S_2}{1-S_1} \text{ where } S_2 < 1 \text{ and} \begin{vmatrix} P_1 < 0 \\ P_2 > 0 \\ p_1 < 0 \\ p_2 > 0 \end{vmatrix} \quad (16)$$

Defining $t_2 = 1/S_2 > 1$ as the safety factor for not having second-order self-locking, the force ratio $e^*$ becomes $$e^* = \frac{1-1/t_2}{1-S_1} \quad (16a)$$

It is clear that, for a drive with ordinary self-locking, $e^*$ may assume any negative value, and can even be larger than unity.

*Application of equations to ordinary worm drive*

Since the assumptions made at the begining were quite general, I can apply the theory to specific cases. Thus, if I assume $(\phi_2-\phi_1)=90°$, I have the shafts at 90° to each other, and the case represents an ordinary worm drive, common inclined plane, or common screw. Since here $$\frac{1}{\tan\phi_2} = \tan\phi_1$$

Equation 12 becomes $$e = \frac{1-f\tan\phi_1}{1+f\tan\phi_1} = \frac{1-f^2/S_1}{1+S_1} \text{ (for case I)} \quad (17)$$

and Equation 14 becomes $$e = \frac{1-f/\tan\phi_1}{1+f\tan\phi_1} = \frac{1-S_1}{1+f^2/S_1} \text{ (for case II)} \quad (18)$$

and Equation 16 becomes $$e^* = \frac{1+f\tan\phi_1}{1-f/\tan\phi_1} = \frac{1+f^2/S_1}{1-S_1} \text{ (for case III)} \quad (19)$$

where $\phi_1$ is the pitch angle of the worm. As is to be expected, Equation 17 is identical to the well-known equation for the efficiency of a square thread. For an Acme or V-thread, I must use the virtual friction coefficient, as given by Equation 10.

For self-locking, $f \geq \tan\phi_1$, which results in $e < 50\%$, a fact known and accepted for a long time.

*Application of equations to an almost self-locking worm drive according to the present invention*

In automobile steering systems, the motion of the steering wheel is usually transmitted to the steering linkage by means of a conventional worm drive. This worm drive is made almost self-locking, to avoid road shock from being felt excessively at the steering wheel. (The drive cannot be made completely self-locking, for then the wheels would not straighten out by themselves after rounding a curve.)

Since the drive is almost self-locking, I assume that $S_1 = f/\tan\phi_1 = 0.80$. If I assume $f = 0.16$ (a reasonable value for oiled steel worms), the efficiency, according to Equation 17, becomes $e = 54\%$. In the reverse direction, the efficiency, according to Equation 18, becomes $e = 19\%$. This latter figure is a measure of how much the road shock makes itself felt at the steering wheel.

Designing, instead, the drive of the present invention according to the theory developed above, I have (again assuming $S_1 = 0.80$ and $f = 0.16$)

$$\tan\phi_1 = f/S_1 = 0.20 \text{ and } \phi_1 = 11.3°$$

Choosing $(\phi_2 - \phi_1) = 3°$, I get $\phi_2 = 14.3°$ and $S_2 = 0.624$.

The above values substituted into Equation 12 or 12a yield an efficiency of $e = 90\%$. The efficiency in the reverse direction is found by Equation 14 as $e = 53\%$.

The above shows that, if the drive of the present invention is used, only about half the force would be required to operate the steering wheel. On the other hand, the road shock would also be transmitted back to the steering wheel with a higher efficiency, which is somewhat of a drawback.

By decreasing $(\phi_2 - \phi_1)$, the efficiency could be increased still further above 90%. However, the efficiency in the reverse direction would then also increase, which is undesirable. On the other hand, if I increase $(\phi_2 - \phi_1)$ to 7.6° in the above example, I obtain an efficiency of 82% (still much better than with an ordinary worm wheel), while the efficiency in the reverse direction drops to 37%.

If I substitute the values of $\phi_1$ and $\phi_2$ obtained in the above examples into Equation 2, I see that the ratio $d/p_1$ is much smaller than one. This means that the sliding velocity between the worms is much smaller than the peripheral velocity. This feature is characteristic of the drive of the present invention, and should make for very little wear.

*Worm drive with ordinary self-locking*

The self-locking property of the worm drive of the invention is a valuable feature when applied to hoists, lifting mechanisms, lift trucks, elevators, heavy drill presses, automatic garage doors, automobile seat adjusting mechanisms, hospital beds, automatic screw jacks and wherever heavy loads must be manipulated or applied. At the same time, due to the very high power transmission efficiency which as stated is of the order of 90% as compared with 45% for conventional self-locking transmissions, much smaller driving motors, speed reductions and power units can be used, and only about one-half the energy is required to operate the device.

Let us assume that the safety factor for self-locking is to be $S_1 = 1.20$. Again assume $f = 0.16$. Proceeding as above, it is found from Equation 17 that a conventional worm drive will have an efficiency of about 44%. On the other hand, a drive according to Figures 1 and 2, choosing $(\phi_2 - \phi_1) = 2°$, and using $S_1$ and $f$ as above, has an efficiency of 89%, or twice that of the conventional self-locking drive.

The transmission can be designed according to either one of two different criteria. It can be designed so that the same input torque is required both for raising and for lowering the load, even where no counterweight is used. In this design, the power unit will be of the minimum possible size. Alternatively, the transmission can be designed so that the power consumption for one complete cycle of raising and lowering the load is at a minimum. In this case, on the other hand, the size of the power unit will be somewhat larger than in the first design.

Drive requiring same power to raise and lower load

Wherever a load is to be raised and lowered, a self-locking device is usually desirable or even imperative as a safety-feature. In some cases, the load is not balanced by a counterweight at all (automobile jack, hoists, lifting mechanisms, etc.); in other cases, it is only partly counterbalanced (elevator).

With a conventional worm drive, the power required to raise the load is much larger than that required to lower it. The motor or power unit used in the particular application must, of course, be chosen according to the power required to raise the load. Utilizing the drive of the present invention, it is possible to design a drive such that the same power is required for raising or for lowering the load. The necessary size of the motor or power unit will then be at minimum, and, in any case, will be much smaller than with a conventional worm drive.

While the load is being raised, I have case I, and the efficiency $e$ is given by Equation 12. While the load is being lowered, I have case III (since the load is trying to help the drive), and the force ratio $e^*$ is given by Equation 16. I assume that the load consists only of deadweight, but does not include any frictional resistance outside of that which exists within the worm drive itself. In that case, the magnitude of the load remains the same, both for raising and for lowering. Therefore, to get the same driving power, both for the opposing and for the collaborating driven load, I must set $e = -e^*$. Substituting the Relations 12 and 16 into this equation, (and assuming that $\tan \phi$ is approximately equal to $\phi$), I obtain the condition $$f = \sqrt{\phi_1 \phi_2} \qquad (20)$$

from which follows $$\frac{1}{S_1} = t_2 = S_1 \qquad (20a)$$

This means that the safety-factor for having ordinary self-locking must equal the safety-factor for not having second-order self-locking. (If there were second-order self-locking, it would be impossible to lower the load altogether.)

Substituting Condition 20a into Equation 12, I find that $$e = -e^* = \frac{1}{S_1} = S_2 \qquad (21)$$

so that, since $$e^2 = S_2 / S_1$$

we have $$e = -e^* = \sqrt{\frac{S_2}{S_1}}$$

$$= \sqrt{\frac{\tan \phi_1}{\tan \phi_2}} \text{ is approximately equal to } \sqrt{\frac{\phi_1}{\phi_2}} \qquad (21a)$$

Applying the above to a numerical example, I again use $S_1 = 1.2$ and $f = 0.16$. The pitch angles of the two worms are $$\tan \phi_1 = f/S_1 = 0.16/1.2 = 0.133$$

so that $$\phi_1 = 7.6°$$

and $$\tan \phi_2 = f/S_2 = fS_1 = (0.16)(1.2) = 0.192$$

so that $$\phi_2 = 10.9°$$

resulting in an efficiency of $e = 1/S_1 = 1/1.2 = 83\%$, as compared to 44% obtainable with a conventional worm drive using the same values of $f$ and $S_1$. This means that, using the drive of the present invention, the motor or power unit need only be about half the load capacity.

Drive with minimum power consumption for raising and lowering load

Sometimes there is a desire for raising and lowering a load with minimum power consumption for one complete cycle. (The power required for raising the load will then not be equal any more to that required to lower it, and the necessary size of the power unit will be larger than in the previous case. The overall power consumption per cycle will be lower, however, because in the previous case considerable power is wasted in lowering the load.)

Assuming that the load $W$ must be raised and lowered through a distance $\Delta h$, I find that the energy $\Delta E$ necessary for one cycle is equal to $$\Delta E = \frac{W \Delta h}{e} + \frac{W(-\Delta h)}{e^*} = W \Delta h \left( \frac{1}{e} + \frac{1}{-e^*} \right) = \frac{2 W \Delta h}{e_m} \qquad (22)$$

where the apparent mean efficiency $e_m$ is defined by $$\frac{1}{e_m} = \frac{1}{2} \left( \frac{1}{e} + \frac{1}{-e^*} \right) \qquad (23)$$

Substituting the values of $e$ and $e^*$ as expressed by Equations 12 and 16, I obtain $$e_m = \frac{1 - S_2^2}{S_1 - S_2} > 2 \qquad (23a)$$

where $S_1 > 1$ and $S_2 < 1$, since I have ordinary self-locking.

In order to obtain minimum power consumption per cycle, I want $e_m$ to be maximum. Setting the derivative $de_m/dS_2$ equal to zero, this leads to the requirement $$(S_2)_0 = S_1 - \sqrt{S_1^2 - 1} \qquad (24)$$

whereupon the apparent mean efficiency becomes $$(e_m)_0 = 2(S_2)_0 \qquad (25)$$

A further relationship between the input and output wedge angles for minimum power consumption can be developed from Equation 24 above, where $$S_2 = S_1 - \sqrt{S_1^2 - 1} \qquad (24)$$

Since $S$ is defined as the ratios of $f$ to the $\tan \phi$, then $$\frac{f}{\tan \phi_2} = \frac{f}{\tan \phi_1} - \sqrt{\frac{f^2}{\tan^2 \phi_1} - 1}$$

$$= \frac{f}{\tan \phi_1} - \sqrt{\frac{f^2 - \tan^2 \phi_1}{\tan^2 \phi_1}}$$

$$= \frac{f - \sqrt{f^2 - \tan^2 \phi_1}}{\tan \phi_1}$$

Thus $$\frac{\tan \phi_1}{\tan \phi_2} = \frac{f - \sqrt{f^2 - \tan^2 \phi_1}}{f}$$

and since $$\frac{\tan \phi_1}{\tan \phi_2} \approx \frac{\phi_1}{\phi_2}$$

for angles less than 20°, $$\frac{\phi_1}{\phi_2} = 1 - \sqrt{1 - \frac{\tan^2 \phi_1}{f^2}} \qquad (24a)$$

Applying the above to a numerical example, and again using $S_1 = 1.2$ and $f = 0.16$, I have, as before $$\tan \phi_1 = f/S_1 = 0.133 \text{ and } \phi_1 = 7.6°$$

From Equation 24, I find $$(S_2)_0 = S_1 - \sqrt{S_1^2 - 1} = 1.2 - \sqrt{0.44} = 0.54$$

and $$\tan \phi_2 = f/S_2 = 0.16/0.54 = 0.296 \text{ and } \phi_2 = 16.5°$$

which results in $$\Delta E = \frac{W\Delta h}{(S_2)_0} = \frac{W\Delta h}{0.54} = 1.85 W\Delta h$$

In order to afford a comparison, I have also compute the means efficiency for the two previous examples, 1 and 4. Taking Example 4, where $S_2 = 1/S_1$, I have $$e = -e^* = e_m = \frac{1}{S_1} \quad (21b)$$

which, substituted into Equation 22, gives $$\Delta E = \frac{2\ W\Delta h}{e_m} = 2.4 W\Delta h$$

To evaluate the mean efficiency for Example 1 (conventional worm drive), I substitute Equations 17 and 19 into 23, and obtain $$e_m = \frac{1 - f^2 \tan^2 \phi_1}{f/\tan \phi_1 + f \tan \phi_1} \approx \frac{1}{S_1} \quad (26)$$

which results in $$e_m = 1/1.22$$

and $$\Delta E = \frac{2\ W\Delta h}{e_m} = 2.44 W\Delta h$$

In order to compare the required size of the power unit for the different examples, I calculate the fraction $$P_1 p_1 = \frac{P_2 p_2}{e}$$

where, for $e$, I use either the efficiency $e$ (Equation 12), or the force ratio $-e^*$ (Equation 16), whichever is smaller. To facilitate comparison, the results are summarized in the table below, which should be self-explanatory. The final choice of drive would be made according to what was more important: minimum size of power unit, or minimum power consumption.

|  | Required Size of Power Unit, $P_2 p_2$ | Power Consumption per Cycle, $W\Delta h$ |
|---|---|---|
| Ordinary Worm Gear | 2.27 | 2.44 |
| Design for minimum Power Unit Size (Equal force to raise and lower load) | 1.20 | 2.40 |
| Design for minimum Power Consumption | 1.43 | 1.85 |

Worm friction applied for braking purposes

It has been seen that, in case III, both forces $P_1$ and $P_2$ act in the same direction against the friction force between the two worms. This friction force could therefore be utilized to perform a useful braking action. For example, it may be desirable to have a braking action the moment the load begins to help the drive and tries to raise its speed. I assume that a braking torque $n$ times the driving torque of the load is desired.

The braking torque is equal to $P_1 p_1 + P_2 p_2$.

I therefore want $P_1 p_1 + P_2 p_2 = n P_2 p_2$ from which follows that $$\frac{P_2 p_2}{P_1 p_1} = \frac{1}{1-n}$$

Equating Equations 15 and 16 and substituting the above, I obtain $$\frac{1}{1-n} = \frac{1 - f/\tan \phi_2}{1 - S_1}$$

from which follows that $$\tan \phi_2 = \frac{f}{1 - \left(\frac{S_1 - 1}{n - 1}\right)} \quad (27)$$

*Numerical example.*—A water pump is driven by a non-synchronous motor. If the pump load should change direction, so that the pump itself wants to drive the motor (the pump wants to run faster than it is being driven by the motor), then I want a braking torque equal to 150% of the pump's driving torque applied within the transmission. (The motor would then have to overcome a positive torque which is only 50% of the pump's driving torque.)

Assuming $S_1 = 1.1$ and $f = 0.16$, and substituting $n = 1.5$ into Equation 27, I have $$\tan \phi_1 = f/S_1 = 0.145 \quad \phi_1 = 8.2°$$

$$\tan \phi_2 = \frac{f}{1 - \left(\frac{S_1 - 1}{n - 1}\right)} = 0.200 \quad \phi_2 = 11.3°$$

According to Equation 12, the efficiency of this drive, when working under ordinary conditions (opposing load), will be 86%. It should be noted that the efficiency will increase as $n$ is increased, and $n = \infty$ signifies total second-order self-locking. The braking action produced in the above example might therefore be visualized as constituting "partial" second-order self-locking. While the drive is not locked, the tendency towards second-order self-locking produces the desired braking force.

Differential gears for use in computing mechanisms

The device of the present invention can be used to prevent one input shaft from affecting the second input of a differential. As seen in Figure 12, an input shaft 36 of a conventional differential 40 can be given one turn, and normally a proportional number of turns is obtained at output shaft 37. The same is true if input occurs from the other input shaft 38. If, however, the resisting torque of output shaft 37 is sufficiently great, then input shaft 38 might turn slightly at the expense of output shaft 37. In the extreme case, output shaft 37 might remain completely at rest while input shaft 38 would get all the motion. This can be demonstrated by jacking up the rear of an automobile and turning one of the rear wheels by hand while the engine is in gear. This interaction between the inputs can be prevented by connecting the input shafts to the differential 40 through a self-locking worm drive as shown in Figure 12a. Conventional self-locking worm drives would not be practical for this purposes because of their low efficiency. The device of the present invention, on the other hand, could be used to advantage, especially for airborne computing mechanisms where the weight of the driving unit is of importance, or wherever small power loss is desired. The fact that the transmission ratio of the drive of the present invention can easily be made equal to one is an additional advantage for computer service.

Second-order self-locking for servo mechanisms

Let us assume that a small flywheel is attached to the outward shaft of one of the devices of Figures 1 to 5 with second-order self-locking. Assume further that the drive is turning but the input force to the drive is suddenly made zero. At that moment the input wheel 1 tends to stop but the inertia of the flywheel attached to the output wheel 2 tends to make wheel 2 go faster than it is being driven by wheel 1. According to the above definition of second-order self-locking, the whole transmission will immediately stop turning. Paradoxically, the inertia of the flywheel, instead of adding to the total inertia of the whole transmission, reduces the effective inertia almost to zero as soon as the transmission is stopped. When the transmission is to be started once more, the flywheel will, of course, add slightly to the total inertia of the transmission while it is getting up to speed.

The moment when the locking action begins can be influenced. Ordinarily, the drive would be locked as soon as the input acceleration becomes zero. If, however, the turning of the flywheel is opposed by some frictional resistance, as by the drag of a belt or leaf spring against the flywheel rim, then the drive will lock only if the deceleration of the input shaft exceeds a certain value. Finally, if the flywheel is connected to the shaft in a flexible manner as by a resilient torsional connection, such as a spring, then the drive will be locked even before the acceleration of the input shaft becomes negative.

By connecting the above system to a position servo-mechanism, overshoot of the servo output can be completely eliminated. Thus, a servo can be produced which has almost perfect damping characteristics. The mechanism can thus replace conventional clutch and brake servos. By proper design, a servo can be built which has a very high frequency response, not obtainable by other means such as the conventional electric servo motors.

*Rotating parts which must stop suddenly*

In the case of hand operated drills, milling machines, dental drills and the like, it may be desired to stop the drill or other tool from turning if it penetrates an unintended area. The electric brakes and the slip clutches used for this purpose are not always effective.

The device of the present invention with second-order self-locking brings the drill immediately to a stop whenever input force stops.

Rotary switches, operating at relatively high speeds, can be stopped immediately at any desired position by the use of second-order self-locking.

*Inclined plane transmission*

For some applications, as to transmit linear motion or to change rotation motion to linear motion, it may be desirable to use an inclined plane combination instead of worms.

In Figure 6 I illustrate a cylinder 41 having a piston 42 and piston rod 43 which is suitably double acting and provided as required with a source of fluid pressure, such as air, at properly regulated relation pressures through pipes 44 and 45 connected to opposite ends. The piston is suitably guided by slide bearing 46. Force applied to a load 47 through a thrust or rod 48 guided by slide bearing 50 through the intervention of an inclined plane 51 on the end of piston rod 43 which is constantly in contact with an incline plane 52 on the cooperating end of thrust or rod 48.

The relations between the axes of piston rod 43 and thruster rod 48 and the relations between the angle of inclined plane 51 and the piston axis inclined plane 52 and the thruster rod axis are identical with the relations already established to obtain ordinary self-locking.

If the angles of the inclined planes are calculated according to the same design equations as those set forth above, then self-locking is obtained with high efficiency.

The device of the present invention may be used, for example, to close doors in trains or buses. Since the drive is self-locking, no air or other fluid need be applied to the power cylinder to hold the door closed.

In some cases it is desired to change rotary motion to linear motion, and in such a case, as shown in Figure 7, a driving worm 53 in accordance with the invention on a shaft 54 journalled in bearings 55 and driven as by motor 56, meshes with its axis in crossing relation as already described with the diagonal teeth 57 on rack 58 guided by slide bearing 60 which applies the output force to load 61. The angles of the threads are identical with the angles which are determined by the equations above, and the same relations prevail as for example in Figures 1 and 2.

It will be evident, of course, that the teeth of the rack are in effect inclined planes. This device is applicable, for example, for raising and lowering car windows. It will be self-locking when the proper angles are used.

*Design aspects*

The transmission ratio in the worm gears according to the present invention is equal to the ratio of the number of threads on the driving and the driven worms. It can thus be set at any reasonable value. Since, however, the lead angles of the worms are established as set forth above, the number of threads on a worm can only be increased by proportionately increasing the worm diameter. It will be evident, of course, that the respective worms can be of widely different diameters if desired.

A factor which contributes to the high load bearing capacity and low wear of the device of the invention is that the efficiency is high and therefore there is very little heat dissipated by the threads.

Also the load bearing capacity of the device of the invention is high and the wear is low since a large number of threads are in engagement all the time, thus reducing the unit pressures.

The device of the invention has the advantage that since many threads are constantly in engagement, errors in machining of a particular thread are likely to have little effect on the precision.

Another factor contributing to low wear is the fact that sliding velocity between the teeth is very low, being only a small fraction of the peripheral velocity of the worm, as compared to conventional worm drives where the two velocities are about equal.

*Operation*

It will be evident that once the device of the invention is properly designed, and the threads or other wedge surfaces are properly brought into engagement, the input member can be operated in either direction at any time to drive the output member. In the ordinary self-locking form the output is unable to turn either forward or backward except as it is advanced by the input, and if it attempts to turn at a speed greater than or in reverse to the input, it cannot do so.

In the second-order self-locking form, if the output attempts to turn at a speed greater than it is driven by the input, the device is locked. If the parts are stationary and the output tries to turn in both of the forms just mentioned, it locks.

In the "almost" self-locking form, it is possible for the output to turn the input but at a very low efficiency whereas the normal drive is of high efficiency.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a self-locking motion transmission device, an input element adapted to move and transmit motion, having an input wedge surface angularly disposed to the direction of input motion, and an output element adapted to move and be driven by the input element, having an output wedge surface angularly disposed with respect to the direction of motion of the output element, the input wedge surface being constantly in engagement with the output wedge surface during motion transmission with an angle of friction between the input wedge surface and the output wedge surface, the angle of the input wedge surface with respect to its direction of motion being equal to or less than the angle of friction, and the angle of the output wedge surface with respect to its direction of motion being greater than said angle of the input wedge surface by an amount which is not in excess of 15 degrees, the excess of said angle of the output wedge surface over said angle of the input wedge surface being equal to the angle of difference in the directions of motion of the input and output elements.

2. A device of claim 1, in which the angle between the output wedge surface and its direction of motion is greater than the angle between the input wedge surface and its direction of motion by an amount not exceeding 5 degrees.

3. A device of claim 1, which has a wedge angle of the output wedge surface which is greater than the angle of friction, the device having ordinary self-locking properties.

4. A device of claim 1, in which the angle of the output wedge surface is less than the angle of friction, the device having second-order self-locking properties.

5. A device of claim 1, in which the input element and the output element both move lineally.

6. A device of claim 1, in which either one of the input or output elements is a worm having worm threads and the other of the input and output elements is a rack having diagonal teeth which mesh with the worm threads.

7. A device of claim 6, which has a wedge angle of the output wedge surface which is greater than the angle of friction, the device having ordinary self-locking properties.

8. A device of claim 6, in which the angle of the output wedge surface is less than the angle of friction, the device having second-order self-locking properties.

9. A device of claim 6, in which the coefficient of friction between the wedge surfaces is equal to the square root of the product of said wedge angles, whereby the power required to raise and lower a load by the device is the same and the size of the power unit necessary to drive the device is a minimum.

10. A device of claim 6, wherein the input wedge angle divided by the output wedge angle is equal to one minus the square root of the entire quantity (one minus the quotient of the square of the tangent of the input wedge angle divided by the square of the coefficient of friction between the wedge surfaces), whereby minimum power consumption is required for raising and lowering a load.

11. A device of claim 1, in which the coefficient of friction between the wedge surfaces is equal to the square root of the product of said wedge angles, whereby the power required to raise and lower a load by the device is the same, and the size of the power unit necessary to drive the device is a minimum.

12. A device of claim 1, wherein the input wedge angle divided by the output wedge angle is equal to one minus the square root of the entire quantity (one minus the quotient of the square of the tangent of the input wedge angle divided by the square of the coefficient of friction between the wedge surfaces), whereby minimum power consumption is required for raising and lowering a load.

13. A motion transmitting device, comprising an input worm having worm threads on a generally cylindrical surface, an output worm having worm threads on a generally cylindrical surface which are constantly in mesh with the worm threads on the input worm, the worm threads being in engagement on intermediate points on their side surfaces with a velocity of sliding which is less than the peripheral velocity of either worm, and establishing an angle of friction between them, the pitch angle of the worm threads on the input worm to the direction of motion being less than the angle of friction and the pitch angle of the worm threads on the output worm to the direction of motion being greater than the pitch angle of the worm threads on the input worm to the direction of motion by an amount not exceeding 15 degrees, this difference between said angles being equal to the angle between the axes of the worms.

14. A device of claim 13, in which the pitch angle of the worm threads on the output worm to the direction of motion exceeds the angle of friction, the device having ordinary self-locking properties.

15. A device of claim 13, in which the pitch angle of the worm threads on the output worm to the direction of motion is less than the angle of friction, whereby the device has second-order self-locking properties.

16. A device of claim 13, in which one of the worms is internal and the other worm is external, the two worms having threads in the same direction (left-hand or right-hand).

17. A device of claim 16, in which the pitch angle of the worm threads on the output worm to the direction of motion exceeds the angle of friction, the device having ordinary self-locking properties.

18. A device of claim 16, in which the pitch angle of the worm threads on the output worm to the direction of motion is less than the angle of friction, whereby the device has second-order self-locking properties.

19. A device of claim 16, in which the external worm has a barrel like contour on which the worm threads are formed.

20. A device of claim 19, in which the pitch angle of the worm threads on the output worm to the direction of motion is less than the angle of friction, whereby the device has second-order self-locking properties.

21. A device of claim 13, in which the coefficient of friction of the engagement surfaces between the worms is substantially equal to the square root of the product of the two pitch angles, whereby the power required to raise and lower a load by the device is the same, and the size of the power unit necessary to drive the worms is a minimum.

22. A device of claim 13, wherein the input pitch angle divided by the output pitch angle is equal to one minus the square root of the entire quantity (one minus the quotient of the square of the tangent of the input wedge angle divided by the square of the coefficient of friction between the wedge surfaces), whereby minimum power consumption is required for raising and lowering a load.

23. A motion transmitting device, comprising an input worm having worm threads on a generally conical surface, an output worm having worm threads on a generally conical surface which are constantly in mesh on the worm threads on the input worm, the worm threads being in engagement at intermediate points on their side surfaces, with a velocity of sliding which is less than the preripheral velocity of either worm, and establishing an angle of friction between them, the pitch angle of the worm threads on the input worm to the direction of motion being less than the angle of friction and the pitch angle of the worm threads on the output worm to the direction of motion being greater than the angle of the worm threads on the input worm to the direction of motion by an amount not exceeding 15 degrees, the axes of the respective conical worms being off center by an angle substantially equal to the difference between the pitch angles of the threads of the two worms.

24. A device of claim 23, in which the angle of the worm threads on the output worm to the direction of motion exceeds the angle of friction, the device having ordinary self-locking properties.

25. A device of claim 23, in which the angle of the worm threads on the output worm to the direction of motion is less than the angle of friction, whereby the device has second-order self-locking properties.

26. A device of claim 23, in which the coefficient of friction between the wedge surfaces is equal to the square root of the product of said wedge angles, whereby the power required to raise and lower a load by the device is the same, and the size of the power unit necessary to drive the device is a minimum.

27. A device of claim 23, wherein the input wedge angle divided by the output wedge angle is equal to one minus the square root of the entire quantity (one minus the quotient of the square of the tangent of the input wedge angle divided by the square of the coefficient of friction of the wedge surfaces), whereby minimum power consumption is required for raising and lowering a load.

28. In a motion transmitting device, an input element adapted to move to transmit motion and having an input wedge surface, an output element adapted to move as it is driven by the input element and having an output wedge surface, the input and output wedge surfaces being constantly in engagement with an angle of friction between them, the angle of the input wedge surface with respect to its direction of motion being greater than the angle of friction by a factor which does not exceed 1.3, and the angle of the output wedge surface with respect to its direction of motion being greater than said angle of the input wedge surface by an amount which does not exceed 15 degrees, the excess of said angle of the output wedge surface over said angle of the input wedge surface being equal to the angle of difference in the directions of motion of the input and output elements.

29. A device of claim 28, in which the angle between the output wedge surface and its direction of motion is greater than the angle between the input wedge surface and its direction of motion by an amount not exceeding 5 degrees.

30. A device of claim 28, in which the input wedge surface is a worm having worm threads on a generally cylindrical surface, and the output wedge surface is a worm having worm threads on a generally cylindrical surface, the respective worm threads being constantly engaging on intermediate points on their side surfaces and with a velocity of sliding which is less than the peripheral velocity of either worm, and their directions (right-hand and left-hand) being opposite, the difference between said angles being equal to the angle between the axes of the worms.

31. A device of claim 28, in which one of the input and output elements is an internal worm having internal worm threads on a generally cylindrical surface, the other of the input and output elements is an external worm having worm threads on a generally cylindrical surface which mesh with the internal worm threads on intermediate points on their side surfaces, with a velocity of sliding which is less than the peripheral velocity of either worm, and the directions of the worms are the same (right-hand or left-hand), the difference between said angles being equal to the angle between the axes of the two worms.

32. A device of claim 31, in which the external worm is of barrel like contour.

33. A device of claim 28, in which each of the input and output elements is a conical worm having worm threads on its cone surface, and the axes of the conical worms are off center by an angle substantially equal to the difference in pitch angles of the threads of the two worms.

34. A device of claim 28, in which either one of the input or output elements is a worm having worm threads and the other of the input and output elements is a rack having diagonal teeth which mesh with the worm threads.

No references cited.